Nov. 27, 1928.

H. H. LOGAN

SHOCK ABSORBER

Filed June 4, 1928

Inventor
Henry H. Logan
By Williams, Bradbury, McCaleb & Hindle
Attys.

Nov. 27, 1928.

H. H. LOGAN

SHOCK ABSORBER

Filed June 4, 1928 4 Sheets-Sheet 2

Henry H. Logan
By Williams, Bradbury, McCaleb & Hinkle
Attys.

Nov. 27, 1928.

H. H. LOGAN

SHOCK ABSORBER

Filed June 4, 1928

Inventor
Henry H. Logan

Nov. 27, 1928.

H. H. LOGAN

SHOCK ABSORBER 1,693,340

Filed June 4, 1928          4 Sheets-Sheet 4

Inventor
Henry H. Logan
By Williams, Bradbury, McCaleb & Hinkle
Attys.

Patented Nov. 27, 1928.

1,693,340

UNITED STATES PATENT OFFICE.

HENRY H. LOGAN, OF CHICAGO, ILLINOIS.

SHOCK ABSORBER.

Application filed June 4, 1928. Serial No. 282,594.

The present invention relates to shock absorbers, and is particularly concerned with improvements in hydraulic shock absorbers for automotive vehicles or the like.

One of the objects of the present invention is the provision of a shock absorber for regulating the action of the springs of automotive and other vehicles in such manner that the bumps and jars resulting from irregularities in the roadway will be absorbed by the springs and shock absorber without excessive vibration or reaction against the vehicle chassis, resulting in a greater degree of comfort for the passengers, and decreasing the destructive effect of vibration upon the vehicle.

Another object of the invention is the provision of a shock absorber which permits relatively free action of the springs at points near the middle of their full range of movement, but which controls the action of the springs on both sides of this normal free range of movement.

Another object of the invention is the provision of a shock absorber capable of permitting small vibrations of the springs near their usual position with an average load, so that vibrations caused by ordinary small irregularities in the roadway will be absorbed by the leaf springs, but excessive vibrations in either direction will be dampened and controlled by the shock absorber.

Another object of the invention is the provision of a novel structure for shock absorbers of the class described, including an increased number of vanes of a larger area, whereby the operating pressure may be reduced to such a low value that ordinary cast iron parts may be employed, thereby greatly decreasing the cost of manufacture and providing a shock absorber which may be economically manufactured on a quantity basis.

Another object of the invention is the provision of a novel structure for a shock absorber of the class described wherein an increased number of vanes are provided and so arranged that these vanes automatically center the rotatable shaft and serve as an additional bearing therefor.

A further object of the invention is the provision of a novel shock absorber structure in which all the working parts are readily accessible, and in which the parts may be assembled without depending upon gaskets to locate the working elements in proper relation with each other.

Another object is the provision of a hydraulic shock absorber which is capable of operation at a relatively low pressure so as to eliminate difficulties resulting from the use of high pressures employed in the prior devices, such as leakage, and to provide a device which is reasonably leak-proof without the use of gaskets, although the latter may be used as an additional precaution.

Another object is the provision of a compact shock absorber structure which may be mounted in a limited space, and in which all the working parts are carried in an integral casing in order to maintain alingnment and rigidity as well as to facilitate accurate manufacture.

A further object of the invention is the provision of a novel and simple adjustable throttling device for shock absorbers of the class described, which is capable of adjustment to provide an extremely great resistance or practically no resistance without resorting to long or complicated passages which might become clogged and which are unsatisfactory in their operation.

Other objects are the provision of a shock absorber of the class described, having an ample bearing surface upon the frame to which it is to be secured, to eliminate rocking or loosening in service; the provision of a packing which will automatically tighten against the shaft to resist leakage; the provision of automatic means for the removal of air in the hydraulic chambers and for replenishing the supply of liquid; and the provision of a casing which is easily manufactured and assembled and easily maintained in a clean condition.

Another object of the invention is the provision of a shock absorber of the class described which is adapted to cause greater resistance to the movement of an axle in a downward direction than when it is moving upward, thereby permitting a controlled upward movement of the axle, but permitting a recoil which is only sufficiently rapid to keep the wheels upon the ground.

Other objects of the invention will be apparent from the following description and from the accompanying drawings, in which similar characters of reference indicate similar parts throughout the several views.

Referring to the drawings, of which there are four sheets.

Figures 1, 6, 7, 8, 9:
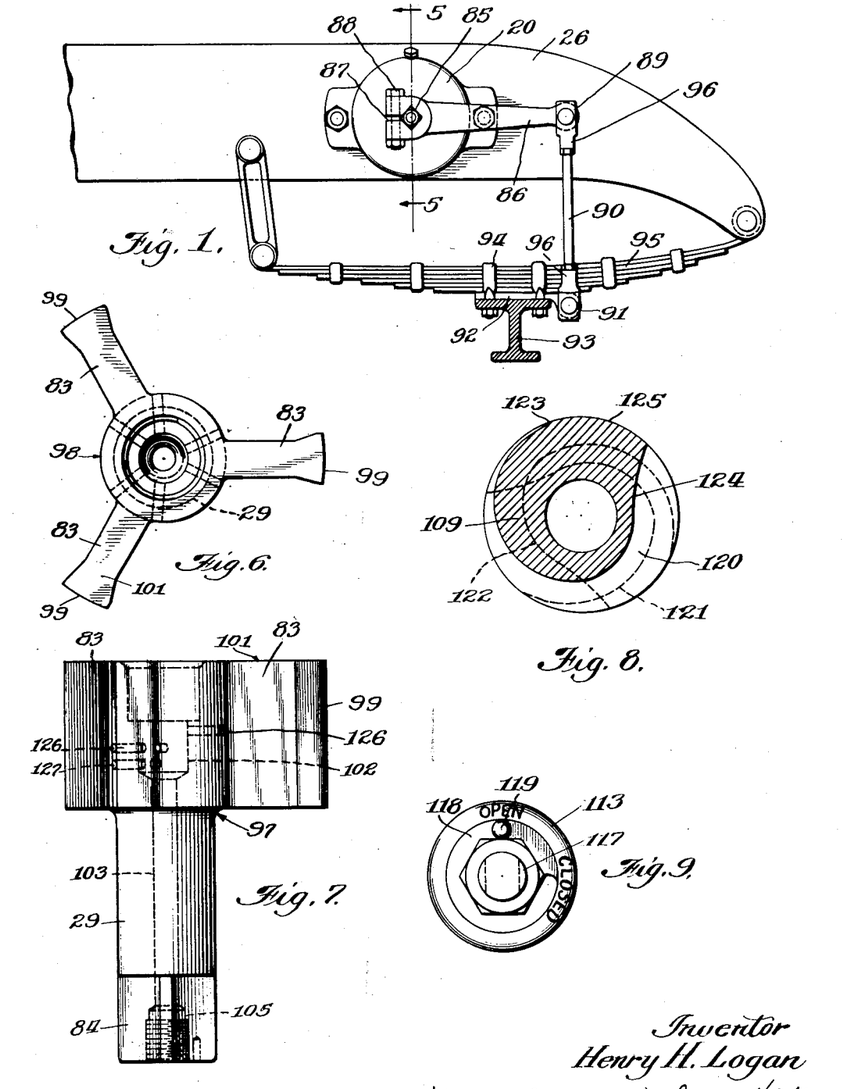
Fig. 1 is a diagrammatic, elevational view of a vehicle equipped with my shock absorber.
Fig. 6 is an end view of the movable shaft and vanes.
Fig. 7 is a side view of the same.
Fig. 8 is a cross sectional view of the throttling device taken on the line 8—8 of Fig. 3.
Fig. 9 is an elevational view of the indicator and manual adjustment for the throttling device.
Figure 2:
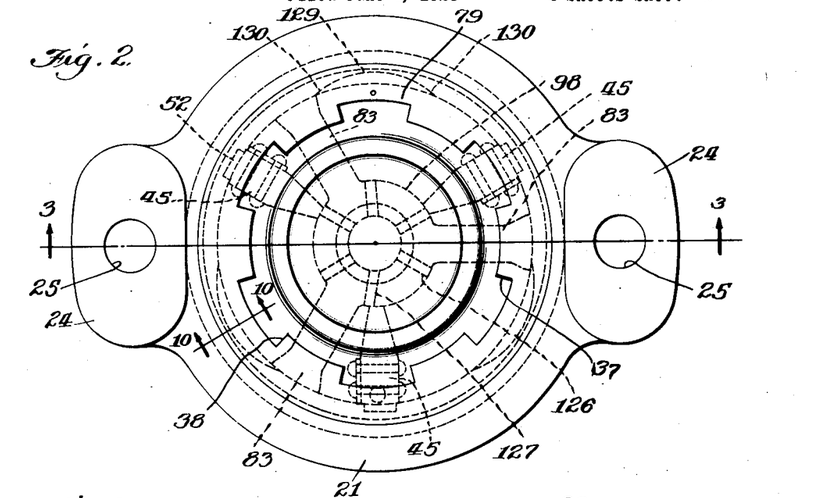
Fig. 2 is a rear elevational view of the shock absorber.
Figures 3, 10:
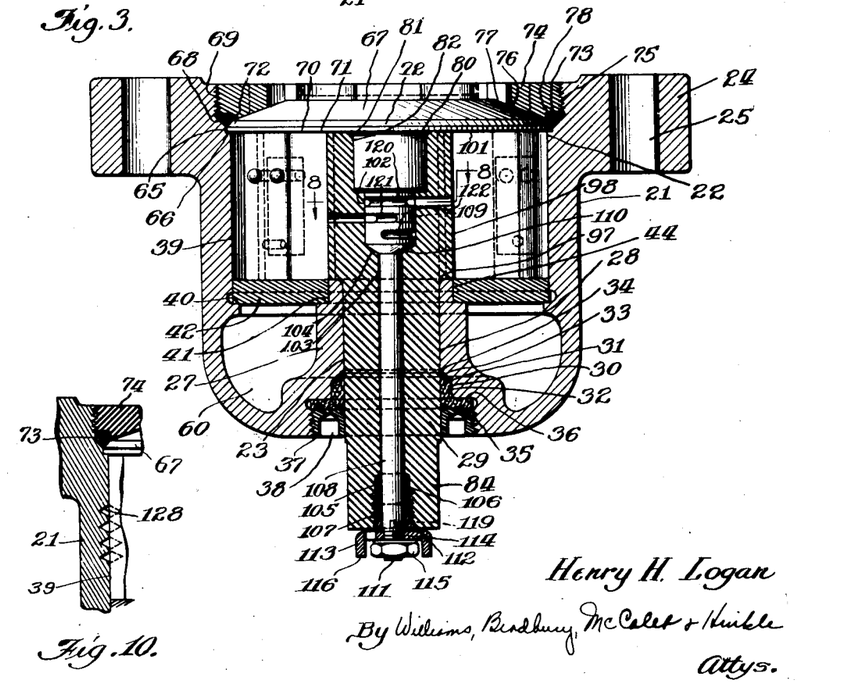
Fig. 3 is a cross sectional view taken on the line 3—3 of Fig. 2, showing the interior mechanism.
Fig. 10 is a cross sectional view of a portion of the casing taken on the line 10—10 of Fig. 2.

Referring to Figs. 1 to 5, 20 indicates in its entirety my shock absorber which is preferably provided with an integral cast metal casing 21 having an open end 22 and having a bearing 23 formed at the opposite end. The casing 21 may be of substantially cylindrical form having outwardly extending lugs 24 provided with apertures 25 for securing the casing to the chassis 26 of a vehicle, and the lugs 24 are preferably widened as shown in Fig. 2 to provide a substantial flat area for engaging with the flat surface of a vehicle frame to prevent rocking of the shock absorber relative to the frame.

The bearing 23 may be formed by an inwardly projecting annular flange 27 having a centrally located bore 28 adapted to receive a shaft 29.

The bore 28 communicates at its outer end with a counterbore 30 which is adapted to receive the annular portion 31 of a flanged leather packing 32. The leather ring 31 is preferably beveled toward the shaft 29 and the space between the bore 28 and counterbore 30 may be frusto-conical in form as at 33 in such manner that the pressure of fluid from the interior of the casing will cause the beveled edge 34 of the leather flange to more tightly engage against the shaft 29. The casing may also be provided with a second threaded counterbore 35 forming a flat annular shoulder 36 against which the leather flanged packing may engage and a threaded ring 37 may be provided for engagement with the threaded counterbore 35 to clamp the packing in place.

The ring 37 may be provided with a plurality of apertures 38 for engagement with a special wrench having lugs complementary to said apertures.

The casing 21 is provided with an interior surface 39 which is accurately machined to substantially cylindrical form, and with annular shoulders 40 and 41 formed upon the inner wall of the casing and upon the bearing flange 27 respectively, for the purpose of supporting a partition 42.

Referring to Figs. 11 to 14, the partition 42 comprises a flat metal member of substantially circular form adapted to fit closely within the cylindrical wall 39 of the casing against the shoulders 40 and 41, and the partition 42 is provided with a central bore 43 adapted to receive the reduced end 44 of the bearing flange 27. The partition 42 also supports a plurality of inwardly projecting fixed vanes 45 which may be cast integrally with the partition, and which extend radially from the edge of the bore 43 to a point slightly beyond the circular edge 46 of the partition.

In order to conserve space, the fixed vanes 45 are tapered toward the bore 43 so that the inner portions 47 of the fixed vanes may extend radially so as to permit a greater range of movement than that which would be possible if the vanes were of equal thickness throughout.

Each of the vanes 45 is provided with a relatively small aperture 48 traversing the vane and closed at one side by a resilient sheet metal leaf 49 secured to the vane by a plurality of rivets 50. The resilient leaves 49 permit liquid to pass through the vanes 45 in one direction, but prevent the return of the liquid through the passage 48. Each of the fixed vanes 45 is provided with an outwardly projecting portion 51 of substantially rectangular cross section and adapted to fit within complementary grooves 52 formed in the cylindrical wall 39 of the casing 21.

It will thus be observed that when the partition 42 is slid into the open end 22 of the casing with the projecting portions 51 of the fixed vanes in the grooves 52, the position of the partition and vanes in the casing is definitely determined by the grooves 52 and the shoulders 40 and 41 upon which the partition is seated, and no relative rotation can occur between the fixed vanes and the casing.

The grooves 52 are preferably located in the casing 21 so that one of the fixed vanes 45 will be in the lowest part of the casing when installed upon the vehicle as shown in Fig. 1, and this fixed vane 45 is provided with a conduit 53 extending through the partition 42 and communicating with a small bore 54 in the side of the vane. The bore 54 is likewise closed by a resilient metal leaf 55 adapted to act as a valve to permit liquid to pass out of the bore 54 but to prevent its return and the two adjacent bores 54 and 48 may be provided with valves by a single sheet of resilient metal 56 which is split as at 57 so as to form the separate leaves 55 and 49.

The partition 42 is also provided at a point directly opposite to the passage 53 with an air passage 58 comprising an extremely small aperture passing through the partition and countersunk on each side as at 59 to facilitate the formation of a very small hole.

It will thus be observed that when the partition 42 is assembled with the casing 21, the interior of the casing is separated into a reservoir 60 and working chambers 61 located between the fixed vanes 45. The reservoir 60 is adapted to provide space for a supply of hydraulic liquid such as oil, for continually replenishing the liquid in the working chambers and this reservoir may be provided with a threaded aperture 63 closed with a filling plug 64.

It should be noted that the reservoir 60 is in communication with the working chambers at the bottom through the valved conduit 53 and at the top through the bleeder or air passage 58, and the operation of this construction will be explained in detail hereinafter.

The open end 22 of the casing 21 is enlarged as at 65 forming an annular shoulder or seat 66 for a cover 67. The shoulder 66 is located even with the rear edges of the fixed vanes 45 so that the cover may engage the flat upper sides of the fixed vanes to divide the casing into working chambers 61 without substantial leakage between the cover and fixed vanes 45. Beyond the enlarged cylindrical portion 65, the open end of the casing may be provided with an outwardly sloping frusto-conical portion 68 terminating in a substantially cylindrical portion or counterbore which is threaded as at 69. The cover 67 comprises a metal member which is accurately machined to the shape shown, having a flat lower surface 70 and a substantially cylindrical outer edge 71 with a frusto-conical portion 72 tapering from the cylindrical edge.

The cylindrical portion 71 is adapted to fit accurately within the cylindrical groove 65 against the shoulder 66 and the frusto-conical portion 72 forms a substantially wedge-like groove in conjunction with the inner frusto-conical surface 68 of the casing. The groove between the frusto-conical surfaces 68 and 72 is adapted to receive a deformable and resilient packing 73 which is forced into place and compressed by a threaded member 74 comprising a ring having threads 75 complementary to the threads 69 on the casing.

The cover 67 and ring 74 may be provided with complementary frusto-conical surfaces 76 and 77 and the ring 74 is provided with an annular groove 78 at its lower outer edge adapted to receive the packing 73. In order to assemble and remove the ring, the latter may be provided with a plurality of notches 79 on the inside of the ring for the purpose of receiving a special tool or wrench.

The cover 67 is adapted to provide a substantially leak-proof closure for the casing 21 without the use of gaskets, but the packing 73 may be provided as an additional precaution and this packing is preferably so arranged that it will be compressed into the groove 68—72 before the ring 74 engages the cover 67.

The cover 67 is also provided with an inwardly projecting cylindrical boss 80 centrally located upon the cover, and axially aligned with the bearing 28.

The cylindrical boss 80 may be provided with a curved surface 81 adjacent its point of attachment to the cover, and the cylindrical boss 80 is adapted to be received in a complementary bore 82 located in the end of the shaft 29. The cover 67 is thus adapted to provide an auxiliary bearing for the end of the shaft 29, thereby accurately locating the shaft within the casing and enabling an extremely accurate fit of the movable vanes 83 within the casing.

The shaft 29 comprises a substantially cylindrical member adapted to be received in the bore 28 and having a non-circular outer end 84 for receiving the complementary non-circular aperture 85 of a pitman arm 86. The pitman arm may be provided with a slot 87 adjacent the squared aperture 85 and with a screw bolt 88 adapted to bind the pitman arm upon the shaft 29. The opposite end of the pitman arm may be provided with a universal joint 89 for connecting the arm to a pitman 90, and the lower end of the pitman may be likewise provided with a universal joint 91 for connecting this member to a plate 92 carried by the axle 93 and secured by the same U-bolts 94 which secure the leaf spring 95 to the axle 93.

The universal joints 89 and 91 comprise balls formed upon the pitman arm 86 and the plate 92 respectively, and socket heads 96 carried by the pitman rod 90 and secured in adjusted position by set screws.

The shaft 29 is provided with an inwardly curved shoulder 97 leading to an enlarged cylindrical portion 98 which supports a plurality of radially extending movable vanes 83. The enlarged cylindrical surface 98 is adapted to fit between the cylindrical surfaces 100 by the inner ends of the fixed vanes 45 and the movable vanes 83 are provided with substantially cylindrical outer edges 99 adapted to fit closely within the cylindrical walls 39 of the casing.

The curved surface 97 below the movable vanes 83 fits against a complementary surface formed upon the interior inner edge of the bearing 28 and the lower edges of the movable vanes 83 are substantially flat and accurately machined to engage the upper surface of the partition 42.

The upper edges 101 of the movable vanes 83 are likewise flat and machined to fit against the lower surface of the cover 67 and the outer edges 99 of the vanes may be thickened to provide an increased area of contact between the outer edge of the vanes and the wall of the casing.

It will thus be observed that the interior of the casing 21 is divided into a plurality of working chambers 61 by the fixed vanes 45 and the hub 98, and the chambers 61 are likewise divided into two separate portions by the movable vanes 83. The hub 98 is provided with a counterbore 102 leading from the bore 82 and with a smaller bore 103 communicating with the counterbore by means of a frusto-conical portion 104. Each of these bores extends axially of the shaft 29 and the small bore 103 extends through the shaft to the outer end, being provided with a counterbore 105 for receiving a packing 106. The counterbore 105 is threaded to receive a gland 107 for compressing the packing 106 closely about the stem 108 of a throttling device 109 carried by the shaft 29.

The throttling device 109 comprises a substantially cylindrical member adapted to fit rotatably within the bore 102 and having a complementary frusto-conical surface 110 and a stem 108 adapted to be received within the bores in the shaft 29.

The outer end of the stem 108 is provided with a threaded portion 111 which may have its sides flattened as at 112 to provide a non-circular portion for engagement with a complementary aperture in an adjusting member 113. The flattening of the sides 112, by cutting away a portion of the threads, also forms shoulders 114 on the stem 108 and the threads remaining are sufficient to be engaged by a nut 115 so that the adjusting member 113 may be clamped between the shoulders 114 and the nut 115.

The adjusting member 113 may comprise a substantially cup-shaped member having an outwardly projecting flange 116 which may have its outer surface knurled for facilitating a manual grip and the adjusting member is provided with a non-circular aperture 117 adapted to fit the end of the stem 108. The adjusting member 113 may be provided with a circumferentially extending slot 118 in its base, the slot being adapted to slidably receive a pin 119 carried by the shaft 29.

The pin 119 provides a stop determining the closed and fully opened positions of the throttling device 109, and the edge of the flange 116 may be provided with appropriate legends "Open" and "Closed" located adjacent the ends of the slot 118. The stem 108 is also preferably provided with washers on each side of the adjusting member 113 to facilitate a relatively close fit and easy adjustment.

The throttling device 109 comprises a substantially cylindrical member which is provided with a plurality of grooves 120, 121 and 122. The grooves 120, 121 and 122 are located at different points in the cylindrical surface of the throttling device, extending circumferentially thereof as shown in Fig. 8 and increasing in depth from the point 123 to a maximum depth 124.

The grooves do not extend entirely about the throttling device, leaving the cylindrical portions 125 which are adapted to effect complete closure of the bores communicating with the grooves.

The hub 98 of the shaft 29 is also provided with passages 126 and 127 leading from points on each side of the movable vanes 83 to the interior of the bore 102. The passages 126 and 127 each register with one of the grooves 120, 121 or 122, thereby enabling the operating liquid to be by-passed around the movable vanes 83 through the passages 126, grooves and passages 127. It should be noted that the starting points 123 and the points of maximum depth 124 of the grooves 120, 121, 122 are not located directly beneath each other, but are spaced circumferentially on the throttling device by an angular distance of 120° so that each of the grooves is adapted to simultaneously present a portion of similar size adjacent the passages 126 and 127 of one of the three working chambers 61.

It will thus be observed that by rotating the adjusting member 113, the passages 126—127 may be completely closed by the throttling device 109 or opened to any degree and adjustment is simultaneously effected for each of the working chambers of the shock absorber.

The cylindrical walls 39 of the casing 21 are provided at a point midway between the fixed vanes 45, with a plurality of grooves 128 which may be of substantially V-shape, having their maximum depth at a point 129 midway between the fixed vanes 45, the depth gradually decreasing to points 130 on each side of the point 129. The grooves 128 are also adapted to by-pass the operating liquid around the movable vanes 83, at points adjacent the middle of the normal range of movement of the movable vanes, and the length of the pitman rod 90 is made such that when the vehicle is provided with an average load and the springs 95 are compressed, the movable vanes 83 are located adjacent the leakage grooves 128.

It will thus be observed that the shock absorber is adapted to permit relatively free movement of the springs adjacent the middle of its normal range of movement with an average load, but as the movable vanes 83 increase their range of movement, increased resistance is provided until at the points 130 the grooves 128 are no longer adapted to by-pass any fluid.

My shock absorber is a distinct departure from the shock absorbers of the prior art in the provision of three fixed vanes and three movable vanes located at equal angular displacements of 120°. My working chambers are also of substantially greater width and depth than the working chambers of the prior art and by the provision of three vanes and an increased area on the fixed and movable vanes, I am enabled to provide a shock absorber which will operate satisfactorily at a substantially reduced operating pressure. This is a very important advantage as many of the difficulties involved in the manufacture and maintenance of hydraulic shock absorbers are caused by the excessive high pressures at which these shock absorbers must operate, and by the provision of a shock absorber which will operate at low pressure, I have eliminated difficulties resulting from leakage, and I am enabled to construct the parts of ordinary cast iron, thereby greatly decreasing the cost of manufacture and maintenance. Furthermore by using three movable vanes spaced at equal angular distances about the shaft 29, I have provided a novel shock absorber in which the movable vanes automatically center the shaft 29 in the working chamber and thus create an additional bearing for the shaft.

The operation of my shock absorber is as follows:

The shock absorber being attached to the vehicle or axle and connected by a pitman rod to the other of these members, any relative movement between the axle 93 and chassis 26 will produce a corresponding rotative movement of the shaft 29, the movable vanes 83 compressing the operating liquid upon the side toward which they are moving, and forcing it through the restricted passages already described.

When the wheels of the vehicle engage ordinary small irregularities in the roadway which do not produce excessive vibration, the movable vanes 83 will vibrate about the middle portion of their range of movement adjacent the grooves 128 where the grooves 128 are adapted to by-pass the liquid and the springs 95 are thereby enabled to act with relative freedom for absorbing small bumps and jars. As observed above, the resistance interposed by the shock absorber gradually increases as the range of movement of the movable vanes 83 increases, and when the vanes 83 pass beyond the grooves 128, a relatively great resistance is provided by the shock absorber against excessive vibration.

Figures 4, 5:
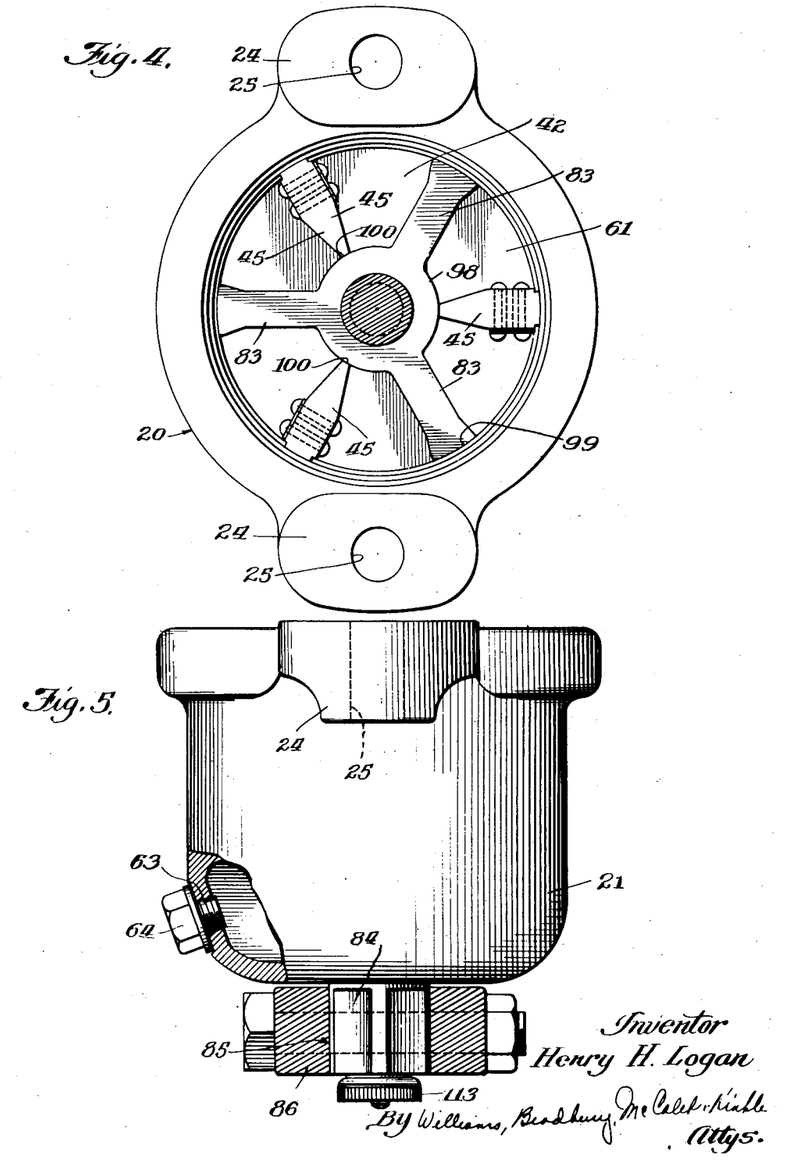
Fig. 4 is a rear elevational view of the shock absorber with the cover plate removed.
Fig. 5 is a side elevational view in partial cross section on the line 5—5 of Fig. 1.
Figure 11:
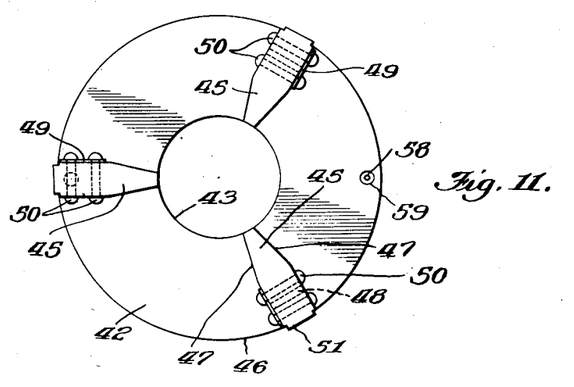
Fig. 11 is an end view of the fixed vanes and casing partition.
Figure 12:
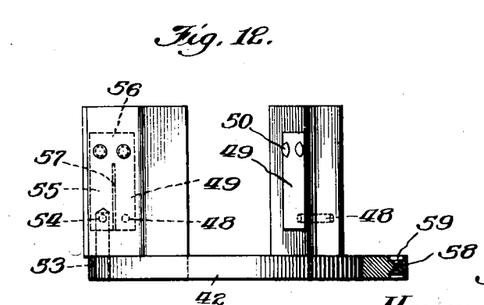
Fig. 12 is a side view of the same.
Figure 13:
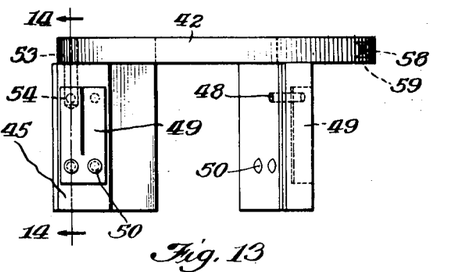
Fig. 13 is a similar view from the opposite side.
Figure 14:
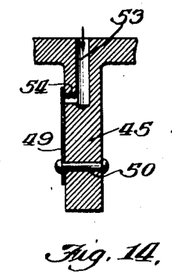
Fig. 14 is a cross sectional view taken on the line 14—14 of Fig. 13, showing the intake valve and passage.

When the wheels of the vehicle encounter a bump or irregularity in the roadway of a size which cannot be satisfactorily absorbed by the springs 95, the axle 93 moving upward toward the chassis 26, will cause the vanes of the shock absorber to move in a counter-clockwise direction in Fig. 1. In Figs. 2 and 4 the movement is clockwise, since these are rear views of the shock absorber, and during this movement, the passages 48 in the fixed vanes 45 and the reed valves 49 are adapted to permit the limited passage of liquid from one chamber 61 to another. At the same time, the operating liquid is permitted to by-pass the movable vanes 83 through the passages 126, 127 and the grooves 120, 121, 122.

It will thus be observed that during the upward movement of the axle toward the chassis, a relatively large area of by-pass is provided so that the shock absorber permits the spring 95 to flex on the upward movement, but it controls and reduces the amount of flexure of the spring.

The throttling device 109 may be so adjusted that the shock absorber and spring will not allow the wheel and axle to fly upward any more than what is necessary to clear the hump in the roadway.

After reaching the top of any obstruction in the roadway with the spring 95 compressed to a greater or lesser extent, the latter tends to recoil rapidly and reacts against the chassis 26, throwing the vehicle upward and transmitting the bump to the occupants of the vehicle. During this movement, the movable vanes 83 will move in a counter-clockwise direction as shown in Figs. 2 and 4, but the reed valves 49 will be forced, by the pressure of the liquid, against the passages 48, closing these passages and substantially decreasing the cross-sectional area of the passages by-passing the liquid. The passages 126 and 127 and grooves 120 to 122 will, however, still by-pass the liquid around the movable vanes 83 so that the movement of the vanes is attended with extremely great resistance, depending upon the position of the throttling device 109.

The recoil is thereby checked sufficiently to keep the wheels upon the ground, but the spring is prevented from reacting quickly against the vehicle to produce a series of oscillations.

As the shock absorber is provided with an air passage 58 in the uppermost working chamber leading to the reservoir 60, the air bubbles which will naturally collect in the uppermost portion of the working chamber will be forced out through the air passage 58, together with a small amount of the liquid whenever pressure is exerted upon the liquid adjacent the passage. At the same time, the passage 53 located near the bottom of the reservoir 60 will be covered by liquid as long as the reservoir has any reserve of liquid and whenever pressure is reduced in the working chamber 61 adjacent the passage 53, the working liquid will be drawn in through the passage 53 and passage 54 past the reed valve 55.

Thus when the adjacent movable vane is moving away from the reed valve 55, liquid will be drawn into the lowest working chamber, but the reed valve 55 will prevent the liquid from passing in an opposite direction through the passages 53 and 54.

It will thus be observed that the air passage 58 and supply passage 53 are adapted to continuously and automatically fill the working chambers with the operating liquid and to exhaust air bubbles from the working chamber, keeping the air in the reservoir 60 as long as there is any reserve supply of oil in the reservoir.

It will thus be observed that I have invented a novel shock absorber structure which is capable of permitting the springs to absorb small vibrations, but which imposes a relatively light resistance to the upward movement of the axle with a greatly increased resistance for the recoil of the vehicle spring, and my shock absorber is adapted to reduce the vibration of the vehicle to a minimum. By providing a structure which can be constructed of ordinary cast iron, I have greatly decreased the cost of manufacture over the shock absorbers of the prior art, and by the elimination of gaskets for positioning the working parts, I have greatly decreased the difficulties of maintenance and repair. All of the working parts of my shock absorber are readily accessible, and the interior may be inspected by merely removing a single threaded member.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a hydraulic shock absorber the combination of a receptacle having three fixed vanes with three movable vanes movably mounted in said receptacle, and adapted to slidably engage the walls thereof, an integral shaft carrying said movable vanes, said shaft having passages past said movable vanes means carried by said shaft for throttling said passages, said casing having a seating surface and a cover adapted to be seated on said surface.

2. In a hydraulic shock absorber, the combination of a metal casing, having an open end and an annular seat in said end, with a cover adapted to be received on said seat, said end being threaded outside said seat, and a threaded ring adapted to engage said threads to secure said cover on said seat.

3. In a hydraulic shock absorber, the combination of a metal casing, having an open end and an annular seat in said end, with a cover adapted to be received on said seat, said end being threaded outside said seat, a threaded ring adapted to engage said threads to secure said cover on said seat, and said cover and seat forming an annular groove below said ring, and a packing adapted to be compressed before said ring engages said cover.

4. In a hydraulic shock absorber, the combination of a metal casing having a bearing formed in one end, with an annular seating surface formed in the opposite end, and a cover adapted to be seated on said surface, said casing having a threaded counterbore above said cover and a flat surface for engaging a chassis.

5. In a hydraulic shock absorber the combination of a metal casing having a bearing formed in one end, with an annular seating surface formed in the opposite end, a cover adapted to be seated on said surface, said casing having a threaded counterbore above said cover and a flat surface for engaging a chassis, an anular seat formed in said casing and upon said bearing, and a partition having a close frictional fit with said casing and bearing.

6. In a hydraulic shock absorber, the combination of a metal casing having a bearing formed in one end, with an annular seating surface formed in the opposite end, a cover adapted to be seated on said surface, an annular seat formed in said casing and upon said bearing, a partition having a close frictional fit with said casing and bearing, a shaft having three integral movable vanes adapted to slidably engage the walls of said casing, and three fixed vanes carried by said partition and received in grooves in said casing.

7. In a hydraulic shock absorber, the combination of a metal casing having a bearing formed in one end, with an annular seating surface formed in the opposite end, a cover adapted to be seated on said surface, an annular seat formed in said casing and upon said bearing, a partition having a close frictional fit with said casing and bearing, a shaft having three integral movable vanes adapted to slidably engage the walls of said casing, three fixed vanes carried by said partition and received in grooves in said casing, and a one way valve controlling a passage through the lower part of said partition, said partition having an air passage adjacent its upper part.

8. In a hydraulic shock absorber, the combination of a metal casing having a bearing formed in one end, with an annular seating surface formed in the opposite end, a cover adapted to be seated on said surface, an annular seat formed in said casing and upon said bearing, a partition having a close frictional fit with said casing and bearing, a shaft having three integral movable vanes adapted to slidably engage the walls of said casing, three fixed vanes carried by said partition and received in grooves in said casing, a one way valve controlling a passage through the lower part of said partition, said partition having an air passage adjacent its upper part, said shaft having passages past said movable vanes, and a throtling device rotatably mounted in said shaft to control said passages.

9. In a hydraulic shock absorber, the combination of a metal casing having a bearing formed in one end, with an annular seating surface formed in the opposite end, a cover adapted to be seated on said surface, an annular seat formed in said casing and upon said bearing, a partition having a close frictional fit with said casing and bearing, a shaft having three integral movable vanes adapted to slidably engage the walls of said casing, three fixed vanes carried by said partition and received in grooves in said casing, a one way valve controlling a passage through the lower part of said partition, said partition having an air passage adjacent its upper part, said shaft having passages past said movable vanes, a throttling device rotatably mounted in said shaft to control said passages, a leather packing beveled toward said shaft and recessed in said casing about said shaft and means for clamping the flange of said leather to said casing.

10. In a hydraulic shock absorber, a throttling device for movable vanes comprising a shaft having a bore and a counter-bore and passages communicating with said counter-bore, a movable member carried in said bore and having a head in said counter-bore, said head having a plurality of passages of tapering cross section, each adapted to register with two of said first mentioned passages for adjusting the effective area of said passages and means carried by the end of said movable member for manual adjustment of said movable member.

11. In a hydraulic shock absorber, a casing provided at one end with a shaft bearing and affording a reservoir and a working chamber having a wall provided with a cylindrical inner surface concentric with said bearing, said reservoir being disposed about said bearing, a partition in said casing separating said working chamber from said reservoir, a plurality of fixed vanes carried by said partition and located in said working chamber, a shaft journaled in said bearing, and a plurality of vanes on said shaft for movement between said fixed vanes and having sliding contact with the aforesaid cylindrical surface, said bearing and said cylindrical working chamber wall being constructed of one and the same piece of metal.

12. In a hydraulic shock absorber, the combination of a casing having a bearing formed in an integral portion of one end of said casing, said casing having a reservoir formed about said bearing and having an internal cylindrical surface forming a working chamber, a partition separating said working chamber and said reservoir, a shaft journaled in said bearing, said shaft being formed with a plurality of integral vanes adapted to slidably engaged said internal cylindrical surface when said shaft is located in said bearing, and a plurality of fixed vanes carried by said casing and slidably engaging portions of said shaft between said movable vanes, said casing and bearing and said shaft and movable vanes, respectively, being constructed of an integral piece of metal.

13. In a hydraulic shock absorber, the combination of a casing having a bearing formed in an integral portion of one end of said casing, said casing having a reservoir formed about said bearing and having an internal cylindrical surface forming a working chamber, a partition separating said working chamber and said reservoir, a shaft journaled in said bearing, said shaft being formed with a plurality of integral vanes adapted to slidably engage said internal cylindrical surface when said shaft is located in said bearing, and a plurality of fixed vanes carried by said casing and slidably engaging portions of said shaft between said movable vanes, said casing and bearing and said shaft and movable vanes, respectively, being constructed of an integral piece of metal, said movable vanes comprising three members located at equal angular distances and adapted automatically to center said shaft in said working chamber.

14. In a hydraulic shock absorber, the combination of a receptacle having a plurality of fixed vanes, with a plurality of movable vanes movably mounted in said receptacle, and adapted to slidably engage the walls thereof, an integral shaft carrying said movable vanes, said shaft having passages past said movable vanes and means carried by said shaft for throttling said passages, comprising a member movably mounted in said shaft and having grooves, each of progressively increasing depth, communicating with said first mentioned passages.

15. In a hydraulic shock absorber, the combination of a receptacle having a plurality of fixed vanes with a plurality of movable vanes movably mounted in said receptacle, and adapted to slidably engage the walls thereof, a shaft carrying said movable vanes and rotatably mounted in a bearing in said receptacle, said shaft having passages extending through said shaft past said movable vanes, and said shaft having a bore therein, and a throttling device for said passages comprising a member rotatably mounted in said bore, said member being provided with a plurality of circumferentially extending grooves of progressively increasing cross section, and communicating with said passages.

16. In a hydraulic shock absorber of the class described, the combination of a casing having a bearing formed therein, said casing having an internal cylindrical surface forming a working chamber, a shaft journaled in said bearing, said shaft being formed with a plurality of vanes adapted to slidably engage said internal cylindrical surface when said shaft is located in said bearing, and a plurality of fixed vanes carried by said casing and slidably engaging portions of said shaft between said movable vanes, said movable vanes equally spaced around said shaft and at angular distances less than 180°.

In witness whereof, I hereunto subscribe my name this 1st day of June, 1928.

HENRY H. LOGAN.